US006442400B1

(12) United States Patent
Ying et al.

(10) Patent No.: US 6,442,400 B1
(45) Date of Patent: Aug. 27, 2002

(54) PORTABLE ELECTRONIC COMMUNICATION DEVICE WITH DUAL-BAND ANTENNA SYSTEM

(75) Inventors: Zhinong Ying, Lund; Dag Mårtensson, Flyinge; Kenneth Håkansson, Malmö, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/187,762

(22) Filed: Nov. 6, 1998

(30) Foreign Application Priority Data

Nov. 6, 1997 (SE) ............................................ 9704052

(51) Int. Cl.[7] ................................................ H04B 1/38

(52) U.S. Cl. ......................... 455/552; 455/553; 455/90; 455/550

(58) Field of Search .......................... 455/90, 128, 129, 455/168.1, 550, 553, 575, 552, 82; 343/702, 872, 878, 752, 895, 850, 852

(56) References Cited

U.S. PATENT DOCUMENTS

| | | | | | |
|---|---|---|---|---|---|
| 4,089,005 | A | * | 5/1978 | Immell et al. | 343/845 |
| 5,337,061 | A | * | 8/1994 | Pye et al. | 343/702 |
| 5,508,709 | A | * | 4/1996 | Krenz et al. | 343/702 |
| 5,572,223 | A | * | 11/1996 | Phillips et al. | 343/702 |
| 5,752,204 | A | * | 5/1998 | Epperson et al. | 455/575 |
| 5,768,691 | A | * | 6/1998 | Matero et al. | 333/101 |
| 5,809,433 | A | * | 9/1998 | Thompson et al. | 455/575 |
| 5,926,751 | A | * | 7/1999 | Vlahos et al. | 455/280 |
| 5,936,587 | A | * | 8/1999 | Gudilev et al. | 343/752 |
| 5,986,609 | A | * | 11/1999 | Spall | 343/702 |
| 5,995,052 | A | * | 11/1999 | Sadler et al. | 343/702 |
| 6,031,495 | A | * | 2/2000 | Simmons et al. | 343/702 |
| 6,069,592 | A | * | 5/2000 | Wass | 343/895 |

FOREIGN PATENT DOCUMENTS

| | | |
|---|---|---|
| GB | 2 293 275 | 3/1996 |
| WO | 94/25999 | 11/1994 |
| WO | 96/38882 | 12/1996 |

* cited by examiner

*Primary Examiner*—Dwayne Bost
*Assistant Examiner*—Sonny Trinh
(74) *Attorney, Agent, or Firm*—Burns, Doane, Swecker & Mathis, L.L.P.

(57) ABSTRACT

A portable electronic communication device, such as a mobile telephone, has first and second housing elements, which are movable relative to each other, and an antenna system for electromagnetic communication within a first and a second frequency band. The antenna system is made by a printed conductive pattern, which is arranged on or in the second housing element and is connected to element for radio communication inside the first housing element. The printed pattern includes an antenna portion and an impedance matching portion for allowing the antenna portion to operate at frequencies within said first and second frequency bands.

20 Claims, 5 Drawing Sheets

PORTABLE ELECTRONIC COMMUNICATION DEVICE WITH DUAL-BAND ANTENNA SYSTEM

This application claims priority under 35 U.S.C. §§ 119 and/or 365 to 9704052-1 filed in Sweden on Nov. 6. 1997; the entire content of which is hereby incorporated by reference.

The present invention relates to a portable electronic communication device, comprising a first housing element, a second housing element, which is movable relative to the first housing element, and an antenna system for electromagnetic communication within a first and a second frequency band.

Background

Mobile or cellular telephones are nowadays perhaps the most common examples of portable electronic communication devices according to the above. Many different digital systems for mobile telecommunications have entered the market in recent years. GSM (Global System for Mobile Communication), for instance, is well-spread across virtually all European countries as well as many places in Asia, Australia, and America. Other common examples are DCS (Digital Communications system), PCS (Personal Communications System), etc. Normally, these mobile telecommunications systems operate in different frequency ranges. In Europe, for instance, GSM uses the 890–960 MHz band, while DCS uses 1710–1880 MHz and PCS uses 1850–1990 MHz. In many countries a plurality of systems are used in parallel to each other, normally operating in different frequency bands, and hence the need for dual-band mobile telephones has become all the more urgent. The need is accentuated by the fact that new kinds of mobile telecommunications services, such as home-based wireless telephones, wireless hands-free sets, wireless LANs (operating in the 2,4–2,5 GHz band), etc, are to be introduced in a near future, or are in fact already here. Consequently, there is an obvious and strong need and demand for communication devices with du al-band antennas.

A general dual-band antenna design is for instance disclosed in WO96/38882 (Ericsson Inc.), where a dual-band printed monopole antenna is operative in two different frequency bands thanks to a parasitic element arranged close to the monopole antenna. The monopole antenna is arranged to be placed, in a conventional way, on top of the telephone apparatus housing. The printed monopole antenna is made from a conductive trace with an electric length, such that a primary resonance occurs within a first frequency band. The parasitic element, which has no direct electric connection with the conductive trace, is arranged to tune the conductive trace into a secondary resonance within a second frequency band.

WO94/25999 (Motorola, Inc.) discloses an antenna, which is arranged in the flip of an electronic apparatus, such as a radio telephone. A transformer is arranged at a hinge mechanism to connect the flip to the main apparatus housing. One transformer winding is located in the apparatus housing, while a second winding is located in the flip. The purpose of the transformer is to couple electromagnetic energy between the antenna in the flip and other electronics located in the apparatus housing as well as to act as an impedance matching element. The antenna according to WO94/25999 is arranged to work in one single frequency band only.

U.S. Pat. No. 5,337,061 (Shaye Communications Ltd) relates to a wireless telephone with a foldable flip pivotally connected thereto. A first antenna is arranged in the flip, and a second antenna is located in the main portion of the telephone, i.e. the apparatus housing. By carefully selecting the design of the two antennas the need has been eliminated for a separate device for switching between the two antennas. However, the two antennas are arranged to operate in the same frequency band, since the telephone according to U.S. Pat. No. 5,337,061 is aimed at obtaining optimum antenna performance during ongoing calls (wherein the first antenna is operative, and the flip is folded down), as well as in stand-by mode (wherein the second antenna is operative, and the flip is folded up).

SUMMARY

An object of the present invention is to provide a portable electronic communication device, comprising a main housing element and a foldable housing element hinged to the former, with a dual-band antenna system with improved efficiency, as compared to the prior art. In particular, the invention is aimed at providing a novel and inventive antenna design, which a) provides an improved antenna efficiency, b) may be manufactured at a very low cost, and c) may easily be modified for different applications.

The objects of the invention are achieved by providing the foldable housing element (e.g. a flip) with a printed conductive pattern, wherein the printed pattern comprises an antenna portion and an impedance matching portion for allowing the antenna portion to operate at frequencies within a first and a second frequency band. The printed pattern acts as a dual-band antenna system and is connected to means for radio communication (e.g. radio circuitry) inside the main housing element (e.g. a telephone housing).

Further objects, features and merits of the present invention appear from the following detailed description of a few embodiments of the invention, and from the appended subclaims as well as the drawings.

BRIEF DESCRIPTION OF THE DRAWINGS

The present invention will now be described in more detail by way of embodiment examples, reference being made to the accompanying drawings, in which.

DETAILED DESCRIPTION

Figure 1:
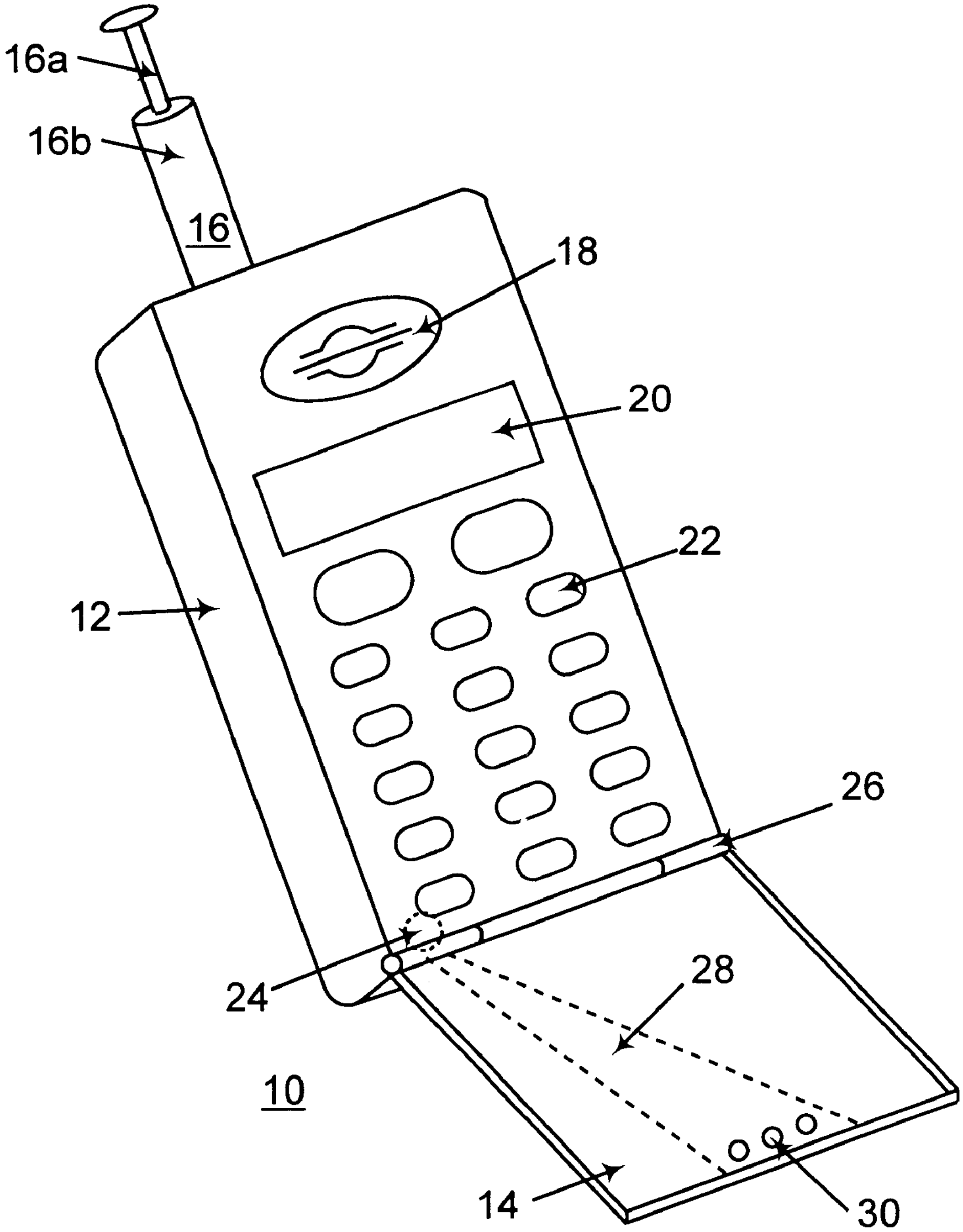
FIG. 1 illustrates a portable mobile or cellular telephone according to the prior art.

In FIG. 1 there is shown a portable electronic communication device 10, or more specifically a mobile telephone, with a dual-band antenna system 16 according to the prior art. The mobile telephone 10 is a conventional cellular telephone, which is arranged to operate in two different frequency bands, such as the GSM band and the PCS band. The telephone 10 comprises an apparatus housing 12 and a foldable flip 14, which is pivotally mounted to the apparatus housing 12 by means of a hinge mechanism 26. In a conventional way the flip 14 will normally be folded up along the apparatus housing 12, thereby covering a lower portion of the front side of the telephone. When the telephone is to be used for answering an incoming call or initiating an outgoing call, the user will fold down the flip 14, so that it takes on a position according to FIG. 1.

The telephone comprises a dual-band antenna system 16, consisting of two antennas 16*a* and 16*b*, wherein the first antenna 16*a* for instance is a retractable whip antenna, while the second antenna 16*b* is a stub or helix antenna. The antenna system 16 is, as appears from FIG. 1, arranged on top of the apparatus housing 12. Furthermore, the telephone comprises an earpiece or loudspeaker 18, a display 20, a keypad 22 and a microphone 24. The microphone 24 is arranged at the bottom of the apparatus housing 12 and is connected to a first end of a sound-guiding channel 28 formed inside the flip 14. A second end of the sound-guiding channel 28 is connected to openings 30 in the flip 14 for receiving acoustic soundwaves from the mouth of the talking user.

Figure 2:
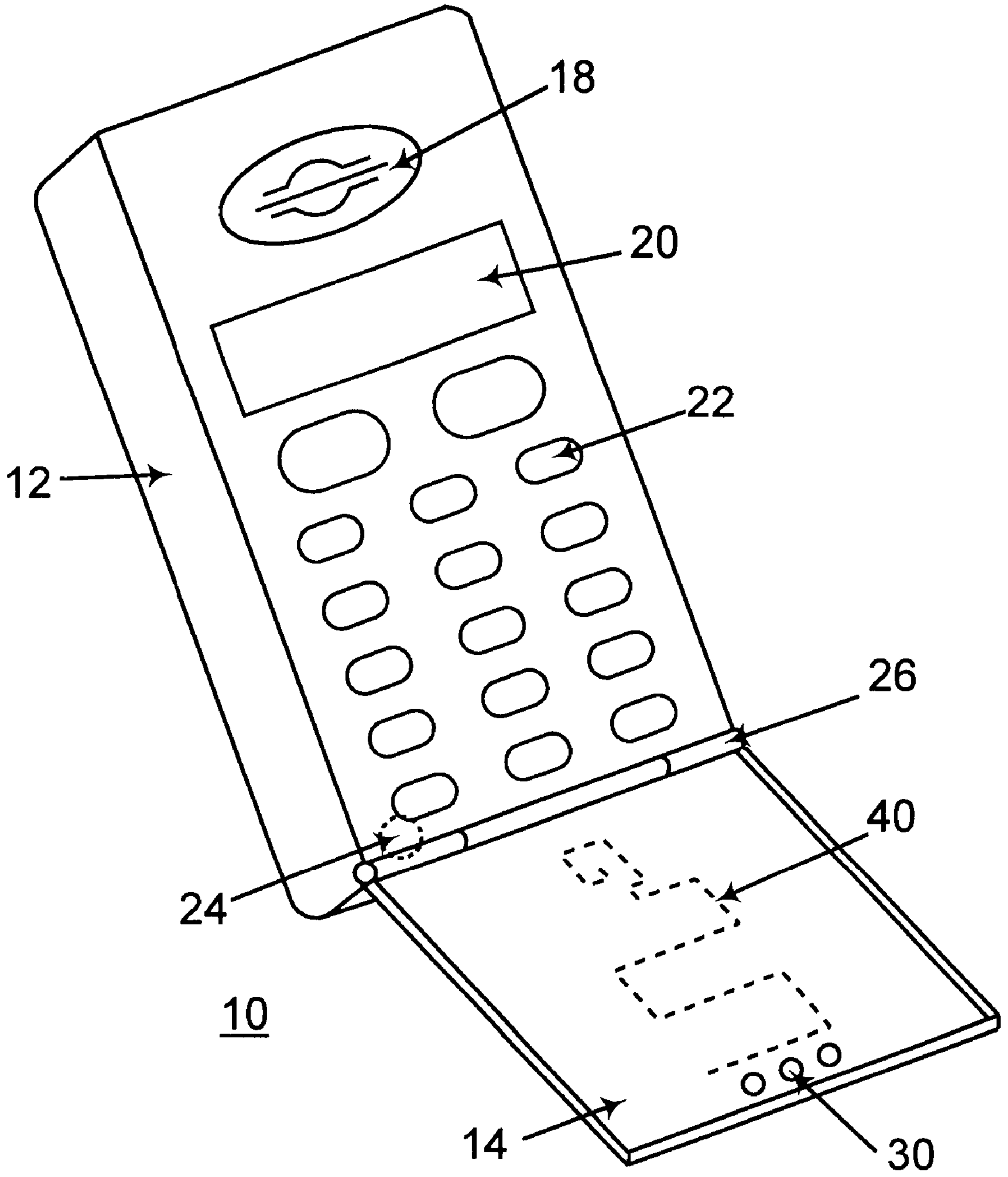
FIG. 2 is a schematic illustration of a portable electronic communication device according to the present invention.

FIG. 2 illustrates, on a schematic level, a portable electronic communication device 10 according to the present invention. The communication device is, for exemplifying but not limiting reasons, illustrated as a mobile telephone, which in similarity to the prior art telephone of FIG. 1 comprises an apparatus housing 12 and a flip 14 pivotally mounted to the former by means of a hinge mechanism 26. Furthermore, the loudspeaker 18, the display 20, the keypad 22 and the microphone 24 are all essentially identical to the corresponding ones in FIG. 1 and hence do not require any further explanation herein. Additionally, in similarity to FIG. 1, the interior of the flip 14 may be provided with a sound-guiding channel extending from sound openings 30 in a lower portion of the flip to the microphone 24, which is located inside the bottom of the apparatus housing 12. For reasons of clarity the sound guiding channel has not been illustrated in FIG. 2.

The major difference between the prior art telephone according to FIG. 1 and the inventive telephone according to FIG. 2 is that the conventional dual-band antenna arrangement 16 in FIG. 1, which is mounted on the upper external surface of the apparatus housing 12, has been replaced by an inventive printed antenna 40, which is arranged on or in the flip 14. The printed antenna 40 is connected to radio circuitry known per se inside the apparatus housing 12 and may hence supply and receive high frequency electric currents to and from the radio circuitry.

By carefully designing the printed antenna pattern according to the present invention a dual-band antenna operative in two different frequency bands is obtained, as will be described in more detail below with reference to the different embodiments of the invention. The length of the printed antenna pattern is selected so that the antenna is resonant in the desired frequency bands, and a certain portion of the printed pattern operates as an impedance matching network. For instance, a dual-band GSM/DCS antenna may be obtained by designing the printed pattern of the antenna accordingly.

In the schematic example of FIG. 2, when the flip is in its opened position, the antenna 40 may operate in different frequency bands depending on the frequency of the current supplied from the radio circuitry inside the apparatus housing 12. When the flip is closed, i.e. folded up along the apparatus housing 12, thereby covering the keypad 22, the antenna may still be operative in at least the higher frequency band. A dual-band antenna pattern arranged in the flip according to the present invention has an important advantage, as compared to the prior art, in that the interaction between the human body of the user and the antenna will be substantially reduced, since the distance between the antenna and the human body is larger than the corresponding distance for a prior art telephone according to, e.g., FIG. 1. Thus, the efficiency of the antenna is improved. As an additional advantage the radiofrequent interference with the acoustic circuits inside the apparatus housing is reduced as well. Furthermore, the antenna design proposed according to the invention makes the connection easier between the external antenna and the radio circuitry inside the apparatus housing 12. Another important advantage is that the design of the printed antenna pattern may very easily be modified or adapted to different applications, such as different frequency bands, different polarization, etc. A few examples of such modifications will be described below with reference to the remaining figures.

Figure 3:
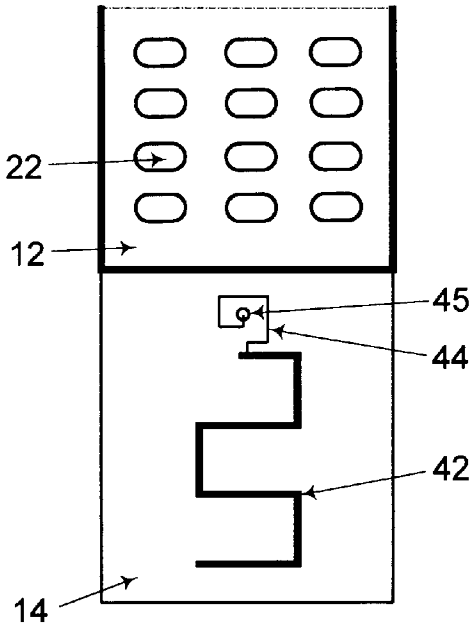
FIG. 3 is a schematic front view of a printed antenna pattern according to a first embodiment of the present invention.
Figure 4:
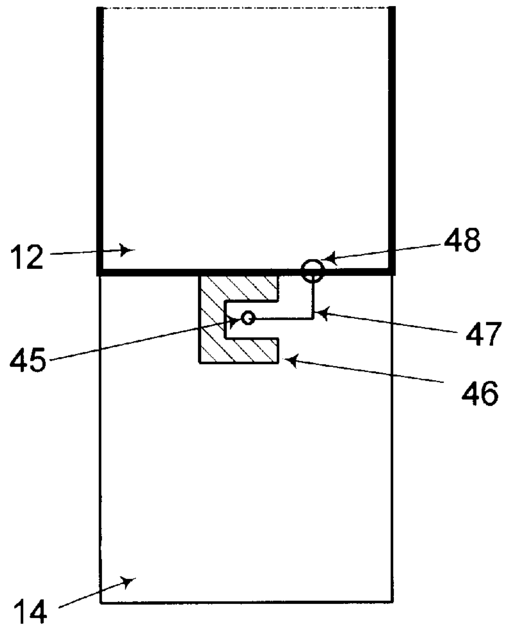
FIG. 4 is a schematic rear view of the embodiment in FIG. 3.

In FIGS. 3 and 4 a first embodiment of the printed antenna pattern according to the present invention is disclosed as schematic front and rear views, respectively. As previously described the antenna pattern 40 is constituted by a printed trace of an electric conductor arranged on the front side of the flip 14. The pattern comprises a first meander-shaped portion 42, which acts as an antenna, and a second spiral-shaped portion 44, which acts as an impedance matching network. The portions 42 and 44 are electrically connected to each other and to the radio circuitry inside the apparatus housing 12 through an opening 45 in the flip 14, a feed line 47 and an external antenna connector 48 arranged close to the hinge mechanism (not disclosed in this figure) on the rear side of the flip 14. The length of the antenna portion 42 is about ¼ of the wavelength(s) in the GSM band (around 900 MHz), and about ½ of the wavelength(s) in the DCS and/or PCS band (around 1800–1900 MHz). Hence, the antenna portion 42 is arranged to operate as a quarterwave antenna in the GSM band and as a halfwave antenna in the DCS and/or PCS band. However, by an appropriate design of the impedance matching portion 44, the length of the antenna portion 42 is not limited to about ½ and ¼ of a wavelength, respectively. Furthermore, the rear side of the flip 14 is provided with a ground patch element 46, which is made of the same material (e.g. a printed metallic strip) as the portions 42 and 44 of the pattern 40. The purpose of the ground patch element 46 is to compensate for distributed inductances and capacitances.

Figure 5:
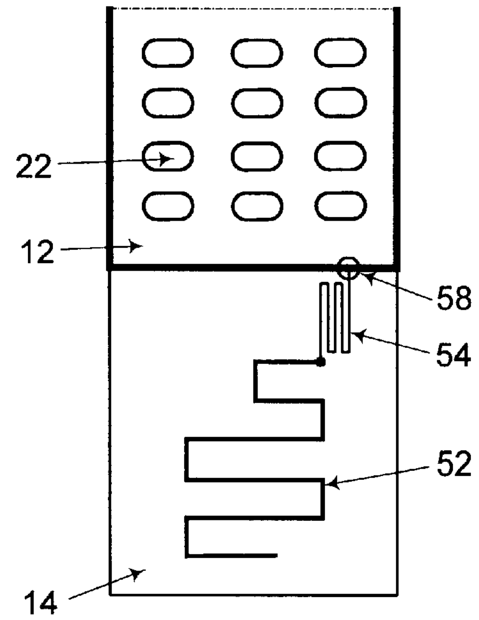
FIG. 5 is a schematic front view of a printed antenna pattern according to an alternative embodiment of the present invention.
Figure 6:
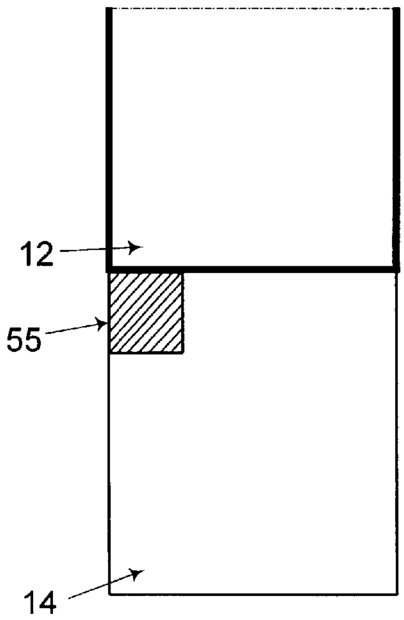
FIG. 6 is a schematic rear view of the embodiment in FIG. 5.

FIGS. 5 and 6 illustrate an alternative embodiment of the present invention. A printed antenna pattern 52, 54 is arranged on the front side of the flip 14, which in accordance with the above is hinged to the apparatus housing 12. A first antenna portion 52 of the printed pattern is given a meander shape, and also a second impedance matching portion 54 is given a meander shape. A first end of the portion 54 is connected to one end of the portion 52, while a second end of the portion 54 is connected to the radio circuitry inside the apparatus housing 12 through an external antenna connector 58. A ground patch element 55 is arranged on the rear side of the flip 14.

Figure 7:
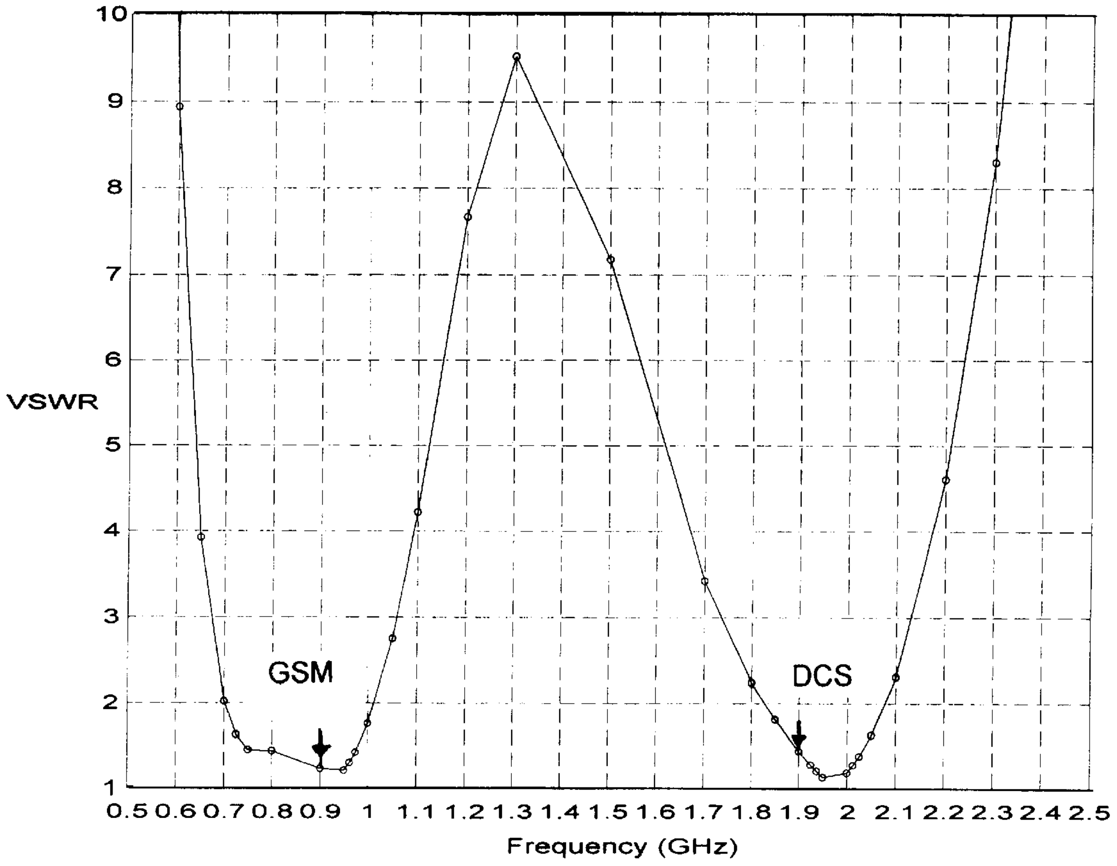
FIG. 7 is a diagram illustrating experimental results obtained for the embodiment according to FIGS. 5 and 6.

In FIG. 7 a diagram is shown, indicating experimental results obtained for the embodiment according to FIGS. 5 and 6. These experiments have verified that such a printed flip antenna can be made to exhibit excellent performance in the desired frequency bands (e.g. GSM and DCS, as indicated by arrows in FIG. 7). The diagram of FIG. 7 illustrates the so called return-loss performance (VSWR), and it appears from the diagram that the inventive flip antenna has a very broad bandwidth. Furthermore, testings as regards radiation pattern in talk position, i.e. when the flip is folded out, have been carried out. These experiments have verified that a flip antenna system according to the present invention has a more uniform radiation pattern as compared to a normal stub antenna system according to the prior art.

The invention has been described above with reference to a set of embodiments, the selection of which has been made for exemplifying reasons only. Hence, the invention shall in no way be regarded to be restricted to these embodiments. On the contrary, the scope of the invention shall be restricted only by the scope of the appended independent patent claims. In particular, it is to be noted that the exemplary frequency bands referred to in the description above, i.e. GSM and DCS/PCS, are only to be regarded as examples. Furthermore, the design of the printed antenna pattern may be varied in ways other than the ones disclosed above, as long as the functional requirements defined by the independent claims are fulfilled. Additionally, the flip may be located on top of the apparatus housing 12, at a long side thereof, etc. The printed antenna pattern may be designed to resonate in more than two different frequency bands.

What is claimed is:

1. A portable electronic communication device for electromagnetic communication within a first frequency band and a second frequency band, comprising a first housing element, radio circuitry inside the first housing element a second housing element, which is movable relative to the first housing element, and a printed conductive pattern, which is arranged on or in the second housing element and is connected to said radio circuitry inside the first housing element, wherein said printed pattern comprises an antenna portion, which is formed along a meander-shaped trace and wherein said printed pattern further comprises an impedance matching portion for allowing the antenna portion to operate at frequencies within said first frequency band and said second frequency band.

2. A device according to claim 1, wherein the antenna portion is arranged to operate as a quarterwave antenna within the first frequency band and as a halfwave antenna within the second frequency band.

3. A device according to claim 1, wherein the first frequency band is the GSM band, and the second frequency band is the DCS or PCS band.

4. A device according to claim 1, wherein said device is a radio telephone.

5. A device according to claim 1, wherein said device is a digital cellular telephone.

6. A device according to claim 1, wherein the impedance matching portion is formed along a spiral-shaped trace.

7. A device according to claim 1, wherein the impedance matching portion is formed along a meander-shaped trace.

8. A device according to claim 1, wherein said first housing element is the main telephone body, while said second housing element is a flip, which is pivotally mounted to the main telephone body by means of a hinge arrangement.

9. A device according to claim 1, further comprising a printed conductive ground patch element which is connected to said first housing element and is arranged on said second housing element.

10. A device according to claim 8, wherein when the flip is in an open position the device is operative in both the first and second frequency bands and when the flip is in the closed position the device is operative in at least one of the first and second frequency bands.

11. A portable electronic communication device for electromagnetic communication within a first frequency band and a second frequency band, comprising a first housing element, radio circuitry inside the first housing element, a second housing element, which is movable relative to the first housing element, and a single contiguous printed conductive pattern having a fixed length, which is arranged on or in the second housing element and is connected to said radio circuitry inside the first housing element, wherein said printed pattern comprises an antenna portion and an impedance matching portion for allowing the antenna portion to operate at frequencies within said first frequency band and said second frequency band.

12. A device according to claim 11, wherein the antenna portion is arranged to operate as a quarterwave antenna within the first frequency band and as a halfwave antenna within the second frequency band.

13. A device according to claim 11, wherein the first frequency band is the GSM band, and the second frequency band is the DCS or PCS band.

14. A device according to claim 11, wherein said device is a radio telephone.

15. A device according to claim 11, wherein said device is a digital cellular telephone.

16. A device according to claim 11, wherein the impedance matching portion is formed along a spiral-shaped trace.

17. A device according to claim 11, wherein the antenna portion is formed along a meander-shaped trace.

18. A device according to claim 11, wherein said first housing element is the main telephone body, while said second housing element is a flip, which is pivotally mounted to the main telephone body by means of a hinge arrangement.

19. A device according to claim 11, further comprising a printed conductive ground patch element, which is connected to said first housing element and is arranged on said second housing element.

20. A device according to claim 18, wherein when the flip is in an open position the device is operative in both the first and second frequency bands and when the flip is in the closed position the device is operative in at least one of the first and second frequency bands.

* * * * *